United States Patent [19]
Feltman

[11] 3,750,325
[45] Aug. 7, 1973

[54] FISHING LURE

[76] Inventor: James M. Feltman, 2054 Loxley Rd., Toledo, Ohio 43613

[22] Filed: Dec. 7, 1971

[21] Appl. No.: 205,637

[52] U.S. Cl............... 43/42.14, 43/42.19, 43/42.39
[51] Int. Cl............................................. A01k 85/00
[58] Field of Search..................... 43/42.14, 42.11, 43/42.13, 42.19, 42.39

[56] References Cited
UNITED STATES PATENTS

| D191,113 | 8/1961 | Hudson, Jr. | 43/42.14 UX |
|---|---|---|---|
| 2,674,823 | 4/1954 | Gellings | 43/42.39 |
| 2,749,646 | 6/1956 | Hall | 43/42.39 X |
| 3,070,917 | 1/1963 | Rowe, Sr. | 43/42.39 X |
| 3,504,454 | 4/1970 | Turbeville et al. | 43/42.11 |
| 2,262,828 | 11/1941 | Allen | 43/42.11 |
| 706,941 | 8/1902 | Hildebrandt | 43/42.14 |
| 2,660,827 | 12/1953 | Pero | 43/42.19 |

Primary Examiner—Louis G. Mancene
Assistant Examiner—Daniel J. Leach
Attorney—Paul F. Stutz

[57] ABSTRACT

A fishing lure comprising, a serial connection, a relatively stiff axial lead shaft having a keel-weighted principal body member and an upper fin, a spinner blade and a trailing hook, all connected together as to preclude any substantial relative rotation as between the lead shaft body and trailing hook. The lure includes in a preferred embodiment a spinner carried by a wire strut extending vertically up from said principal stiff shaft, said strut carrying a freely spinnable blade, all constructed and arranged with the upper spinner spoon situated generaly vertically above the principal body member.

8 Claims, 3 Drawing Figures

PATENTED AUG 7 1973
3,750,325
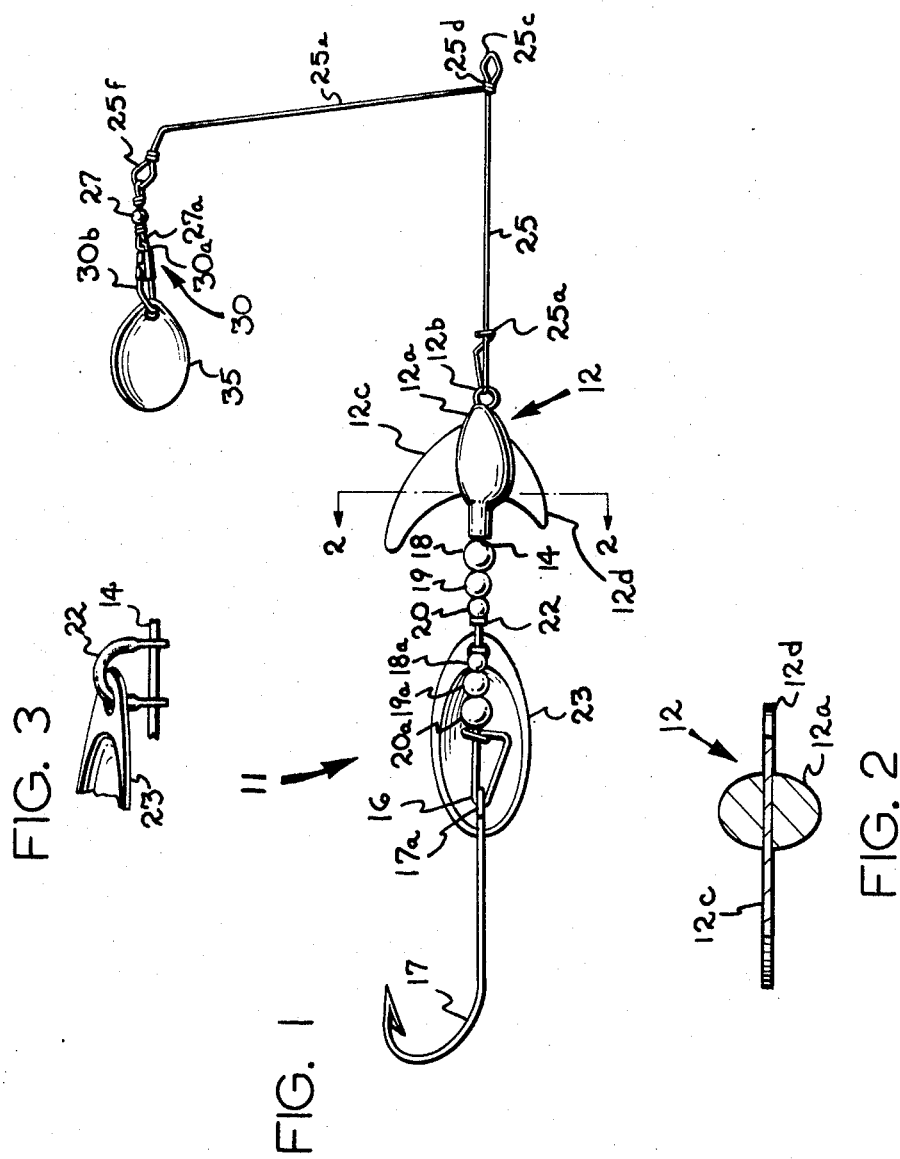
INVENTOR.
JAMES M. FELTMAN
BY
Paul B. Stutz
ATTORNEY

FISHING LURE

The present invention relates to a fishing lure and, more particularly, to a fishing lure composed of a serially connected plurality of components selected, designed and arranged as to impart a unique motion of the entire lure in its movement through the water. Fishing lures of many designs and configurations and fishing lures composed of various combinations of components, such as beads, spoons, spinners, hooks and connectors, are well known in the art. The lure of the present invention, however, comprises a unique selection and assembly of components as it imparts a unique movement and vibration and imparts thereto a unique attractiveness to fish. The lure of the present invention embodies two principal movements. One of the movements is described and occurs when the lure moves relative to the surrounding water at a relatively low rate of speed. A second more vibrant movement occurs when the lure is moved relative to the water at a relatively high rate of speed.

The lure of the present invention is particularly designed and finds most advantageous results when drawn through the water but near the land mass bottom. The fishing lure of the present invention is thus found to have its highest utility or greatest utility in terms of attracting fish as measured by fish caught when used in and around submerged reefs such as are found proximate the islands of the Great Lakes, particularly Lake Erie.

It is an object of the present invention to provide a fishing lure composed in part and made in part of known materials but embodying at least one novelly configurated and designed body member which is incorporated with said known components in such a distinct manner as to constitute a unique assembly of components as exhibits, in movement thereof through the water, outstanding fish attractiveness.

It is a particular object of the present invention to provide a multi-component lure which is relatively inexpensive and of essentially simple design.

It is still another object of the present invention to provide a lure which features primary and secondary attention-focusing elements as appear uniquely irresistible to fish.

It is yet another object of the present invention to provide a lure which is possessed of several differing movements, depending upon the speed or rate of progress of the lure through the water.

The foregoing and, as well, other objects of the present invention will become apparent to those skilled in the art from the following sheet of drawings on which there is presented, for purposes of illustration only, a single embodiment of the assembly of component parts of which the fish lure of the present invention is composed.

IN THE DRAWINGS

FIG. 1 is a side elevation view of the lure composed of a plurality of components which are designed and connected together in such a manner and sequence as to impart to the overall lure assembly unique movements and vibrations as lend novel and outstanding attractiveness;

FIG. 2 is a sectional view taken on the line 2—2 of FIG. 1; and

FIG. 3 is an enlarged view of the connection of two parts of the lure of the invention.

Referring now more specifically to the drawings for a more complete and full understanding of the nature of construction, there is shown in FIG. 1 the lure 11 of the present invention. The lure 11 is composed of a plurality of components connected together. Reference numeral 12 identifies the main body member comprising a central portion 12a of what may be described as teardrop configurations having at its fore end a connecting eye 12b, a vertically upward and rearwardly flaring upper curved fin 12c and a somewhat smaller rearwardly curved vertically depending keel 12d. The central portion, as well as the upper and lower fins, may be of different colors for visual impact. Extending rearwardly and axially from the central region or portion 12a of body 12 is a wire shaft 14 which terminates in a series of bends forming a releasable safety hook 16 of utility for releasably securing to said shaft 14 through hook 16 a fish hook 17 of conventional design featuring a forward eye 17a engaging the hook 16. The shaft 14 bears thereon, in axial relation, a serially located plurality of beads 18, 19, 20, 18a, 19a and 20a. The beads 18, 19 and 20 are of successively smaller diameter, while the beads 18a, 19a and 20a are of successively larger diameter; all taken from a forward to an aft location on wire shaft 14. Between bead 20 and bead 18a, there is rotatably carried on the shaft 14 a U-shaped clevis 22 carrying spinner 23 which, by reason of the clevis connection to the shaft, is able to freely spin about the shaft.

The fore eye 12b of principal body 12 connects to a relatively rigid lead shank wire 25 having at its aft end a safety hook configuration formed therein and identified by the reference numeral 25a which is adapted to engage the eye 12b in a non-rotating fashion. The lead shank wire 25 extends axially forward to a fore end defined by a plurality of bends and twists designed to form a connecting eye 25c; the shaft wire 25 being wound upon itself as at 25d and thence extending in a vertically upward direction to define a stiff upwardly projecting strut wire 25e. The upper end of the strut wire 25e is bent and wound upon itself to define an eye 25f. Extending aft from eye 25f is a spinner link 27 having at its aft end an eye 27a to which is releasably secured a double connector hook 30 featuring a forward safety pin connector 30a and at its aft end a safety hook 30b connecting with trailing spinner blade 35. The spinner blade 35 is free to spin freely by reason of the spinner link 27.

The principal body 12 is rather carefully designed so that, in the movement thereof through the water at the proper velocity as urged by a pulling tension in the fishing line exerted on eye 25c and shank 25, the keel member 12d will in fact depend almost straight down and the upper fin 12c will extend vertically straight up. This is accomplished by proper selection of materials. Thus, the cylindrical or teardrop shaped central body 12a and the keel 12d are formed of a relatively heavy material such as lead, particularly as relatively compared to the upper fin 12c which has been found to be desirably formed of aluminum or nickel brass. The particular selection of arrangement as described creates, in effect, a weighted keel with a thin upwardly and rearwardly flaring fin 12c of less intrinsic weight whereby the body member, considering all of the other components, when pulled through the water, will assume the configuration as shown in both FIGS. 1 and 2.

It is a desirable feature of the present invention that the shank 25, body 12, shaft 14 and hook 17 are serially connected together in a manner that relative rotation of the parts does not occur. Thus, the connection of eye 12b with the hook 25a does not permit free rotation although it will be recognized that the body 12 and shank 25 can rotate about 90°, considered axially. The body, of course, is secured to the shaft 14 which terminates in hook 16 which engages in relatively non-rotational relationship the hook 17 although, there again, some degree of freedom is provided by the engagement of the hook 16 with the eye 17a in the forward shank of the hook. The spinner blade 23, on the other hand, by reason of the clevis connection 22, is free to spin freely a full 360° about the axis of the shank 25, shaft 14 and hook 17. Additionally, the upwardly projecting wire strut 25e is not free to rotate but is relatively rigid by reason of the wraparound connection at 25d. Thus, the longitudinal axis of the lure, as determined by lead shank 25, body 12, shaft 14 and hook 16, is relatively fixed with respect to the angular relationship of the strut 25e.

It is a further desirable feature of the lure 11 of the present invention that the upper wire strut 25e has trailing from its upper terminus, via the formed eye 25f, a freely rotatable spinner 35 releasably secured via hook 30 to the spinner link 27, allowing full 360° rotation of the connector hook 30 and aft spinner blade 35.

The design of the shank 25 and strut 25e, including the employment of the trailing spinner link 27 and spinner blade 35, is such that the upper spinner 35 is situated in a desirable position which is enticingly above the principal body 12 and also above the spinner 23, serving thereby as a secondary attraction.

A distinct advantage and purpose for the connection of the serially connected parts including the shank, body and hook in non-rotating assembly is to preclude any twist being put into the line as the lure is drawn through the water, either as trolled behind the boat or upon activation of the reel containing the supply of fishing line. Twisting is frequently encountered in the employment of certain lures and is found to be very objectionable since it leads to tangles and backlashes, etc., usually such occurring at a most inopportune time.

The lure of FIG. 1 as previously referred to exhibits several different actions, depending upon the speed at which it is caused to move through the water. At speeds generally below two to three miles per hour, e.g., several hundred feet per minute, the lure moves generally as follows. The movement is, of course, generally linearly through the water with the components in serial train but with the body 12 laying, as it were, on its side with the fin 12c projecting laterally and the keel 12d projecting laterally. It may be noted, of course, as referred to hereinbefore, that the keel 12d is formed of relatively heavy lead whereas the fin 12c is formed of relatively lightweight material such as aluminum or nickel brass. It may be further noted that the relative size of the two components are different; the keel being somewhat smaller than the larger fin. The disparity in size and weight causes the lure to simulate a wounded fish; specifically a wounded minnow. Thus, the lure will move generally linearly but with an up and down sinuous movement, coupled with an occasional erratic, noncyclic lateral movement. The moments of movement up and down and right to left are both erratic even though the pull on the fish line is the same. Stated another way, the movement, whether to right and left, up or down or a combination thereof, cannot be predicted. Stated still another way, the action being erratic, noncyclic, nonpredictable is, in fact, therefore natural as applied to a wounded minnow. It is, of course, this attribute that creates the attractiveness and effectiveness of the lure of the present invention. The regular spinning of the spinner blade 23 seems to accentuate the action. The cause of the erratic movement, while not known with complete certainty, is suspected as being due to the fact that the body 12 is, from a center of gravity point of view, eccentric by reason of the heavier keel 12d. At the same time, from the standpoint of fluid dynamics, the body 12 is also egocentric or off center by reason of the disparate sizes of the fin 12c as compared to the keel 12d. Both of these, being fin-like, do respond to the flow of water past the lure as urged forward by tension in the line. Thus, when the natural weight eccentricity causes the body to assume a particular spatial attitude in combination with the pull of the user, there is presented a particular array of faces and surfaces of the body including the keel surface and fin surface to the onrushing surrounding body of water. This immediately induces body movement in attempting to assume a balanced fluid dynamically stable position. While attempting to assume this stable position, it is, of course, hampered by the trailing beads, spinner and hook and this degree of hampering is dependent to a considerable degree upon the specific position of the spinner 23 in its rotating path about the shaft 14. As a consequence, the body does not ever reach a position of fluid stability due to the drag, weight and the action of the spinner; rather it merely assumes a spatial attitude which represents another position of fluid dynamic imbalance whereupon a different fin, body and keel surface condition is presented to the surrounding moving body of water, inducing yet another attempt of the lure body to assume some stable position; all modified, of course, by the weight eccentricity. This action is continuous but nonrepetitive in the sense that the attitude is rarely, if ever, the same such that the lure, in effect, moves in any sort of constant or predictable path; rather the forces acting on the body are consistently variable; the only constants being the pull of the retriever and the weight of the main body 12 and the keel 12d and, of course, the weight of the trailing components. What in effect is achieved is that the lure, passing through the water, is in a state of perpetual imbalance, considered fluid dynamically. The end result of all of the foregoing is that the lure, particularly at low speeds, proceeds in an erratic fashion. At higher speeds, the lure assumes a configuration principally that the body tends to move into an upright position with the keel 12d pointed downward and the fin 12c extending essentially vertically upward. In this position, the lure assembly of component parts tends to move in a somewhat more linear path in its movement through the water; the primary action of attractiveness to the target fish being imparted by the movement of the spinners 23 and 35. The action of these spinners understandably becomes more violent and vigorous at the somewhat higher speeds, considering that they are freely rotatably carried by their respective mountings.

The action of the entire lure 11 at the higher speeds may be characterized as one of rapid vibration. The rapid vibration is due to the interaction of many factors. One factor, of course, is the weight imbalance of the main body 12 which is not perfectly symmetrical and, as a consequence, is dynamically unstable. The lower spinner blade 23 spins extremely rapidly. The same is true of the upper spinner blade 35. The violent spinning of the spinner 35 propagates wave motion outwardly and downwardly; such wave motion affecting the body 12 including the keel 12d and certainly the upper fin 12c and, as well, the spinning of the spinner blade 23. All of these actions are, of course, further affected by the arrangement and manner in which the number of component parts hereinabove described are connected together.

From the foregoing, it can be seen that the lure of the present invention is of relatively simple construction and includes a number of known available components. However, by the selection and arrangement of the assembly of components and the specific design of one of them, there is created a lure which is possessed of the capability of exhibiting in the water a pattern of uniquely erratic movements further characterized by considerable vibratory motion, particularly at the higher speeds, whereby there exists two distinct patterns of movement; one at low speed and one at high speed. The lure is possessed of the very desirable property of not imparting twist to the line as used.

The spinners 23 and 35 have been shown as formed in conventional fashion. It will be appreciated that other spinner type elements may be substituted for one or both of the spinner blades 23 and 35.

Other obvious substitutions of materials of construction and substitution of component parts may be made without departing from the spirit of the present invention as described hereinabove. Accordingly, all obvious modifications and substitutions are intended to be included within the scope of the invention unless to do so would be clearly violative of the language of the appended claims.

I claim:

1. A fishing lure device comprising:
    1. a generally teardrop-shaped principal body having
        (a) fishing line connection means at its fore end,
        (b) a vertically-depending, weighted keel generally centrally thereof and (c) an upstanding fin generally diametrically opposite said keel,
    2. a shank wire extending rearwardly from said principal body in general axial alignment with the longitudinal axis of said body,
    3. a spinner blade rotatingly carried by said shank wire and
    4. a fish hook nonrotatably but releasably secured to said shank wire at the aft end.

2. A fishing lure as claimed in claim 1, wherein said fin curves upwardly and rearwardly.

3. A fishing lure as claimed in claim 2, wherein said fin is larger in area than said keel.

4. A fishing lure as claimed in claim 3, which includes an upwardly projecting strut wire connected to said body member and a spinner rotatably connected to the upper terminus of said strut.

5. A fishing lure as claimed in claim 1, which includes an upwardly projecting strut wire connected to said body member and a spinner rotatably connected to the upper terminus of said strut.

6. A fishing lure as claimed in claim 4, wherein said keel curves smoothly downwardly and rearwardly.

7. A fishing lure device comprising:
    1. a relatively stiff lead wire having at its fore end means for engaging a fishing line and at its aft end a releasable and nonrotatable connection means,
    2. a generally teardrop-shaped body connected to said latter means in general axial alignment with the lead wire, said body having a weighted keel depending vertically therefrom and a fin upstanding and opposite said keel,
    3. a shank wire extending rearwardly from said principal body in general axial alignment with the lead wire,
    4. a spinner blade rotatingly carried by said shank wire and
    5. a fish hook nonrotatably but releasably secured to said shank wire at the aft end.

8. The fishing lure as claimed in claim 7, wherein said relatively stiff lead wire has secured thereto, in vertically upstanding relationship, a relatively stiff wire strut member terminating in an eye hook located above the axis of said lead wire a distance approximately equal to the length of the lead wire, said strut eye hook bearing rotatably connected thereto a spinner.

* * * * *